United States Patent
Bays et al.

(10) Patent No.: US 12,552,255 B2
(45) Date of Patent: Feb. 17, 2026

(54) VEHICULAR DISPLAY HAVING RECHARGING MODULE WITH ANNEXATION INTERFACE

(71) Applicant: GHSP, INC., Holland, MI (US)

(72) Inventors: Jeffrey L. Bays, Grand Haven, MI (US); Keith Mulder, Zeeland, MI (US); Richard W. Harris, Wyoming, MI (US)

(73) Assignee: GHSP, Inc., Holland, MI (US)

( * ) Notice: Subject to any disclaimer, the term of this patent is extended or adjusted under 35 U.S.C. 154(b) by 265 days.

(21) Appl. No.: 17/944,281

(22) Filed: Sep. 14, 2022

(65) Prior Publication Data

US 2023/0078206 A1 Mar. 16, 2023

Related U.S. Application Data

(60) Provisional application No. 63/243,883, filed on Sep. 14, 2021.

(51) Int. Cl.
*B60K 35/22* (2024.01)
*B60K 35/10* (2024.01)
*B60K 35/50* (2024.01)
*B60K 35/60* (2024.01)
*B60K 35/85* (2024.01)
*B60K 35/80* (2024.01)

(52) U.S. Cl.
CPC .............. *B60K 35/22* (2024.01); *B60K 35/50* (2024.01); *B60K 35/60* (2024.01); *B60K 35/10* (2024.01); *B60K 35/80* (2024.01); *B60K 35/85* (2024.01); *B60K 2360/11* (2024.01); *B60K 2360/1438* (2024.01); *B60K 2360/332* (2024.01); *B60K 2360/47* (2024.01); *B60K 2360/566* (2024.01); *B60K 2360/589* (2024.01)

(58) Field of Classification Search
CPC ........ B60K 35/00; B60K 35/10; B60K 35/80; B60K 35/85; B60K 2360/11; B60K 2360/1438; B60K 2360/332; B60K 2360/47; B60K 2360/566; B60K 2360/589

See application file for complete search history.

(56) References Cited

U.S. PATENT DOCUMENTS

9,055,162 B2   6/2015   Park et al.
10,199,872 B2  2/2019   Jung et al.
(Continued)

*Primary Examiner* — Rachid Bendidi
*Assistant Examiner* — Kirsten M Santos
(74) *Attorney, Agent, or Firm* — Price Heneveld LLP (57) ABSTRACT

A vehicle includes a host display that has a graphic user interface that incorporates a touchscreen. At least a portion of the host display includes a charging interface. A docking port is disposed proximate the host display. The docking port is configured to selectively couple with a portable computing device that has a portable display. Engagement of the portable computing device with the docking port places the portable display of the portable computing device in front of the charging interface of the host display. A controller of the host display is placed in electrical communication with the portable computing device to charge a battery cell of the portable computing device. Engagement further adjusts the graphic user interface of the host display to selectively assimilate the portable display of the portable computing device to define the portable display as an annexed display of the host display.

19 Claims, 6 Drawing Sheets

(56) References Cited

U.S. PATENT DOCUMENTS

| | | |
|---|---|---|
| 10,691,207 B2 | 6/2020 | Biggs et al. |
| 10,886,769 B2 | 1/2021 | Kasar et al. |
| 2009/0146909 A1* | 6/2009 | David .................. G06F 1/1632 |
| 2012/0023463 A1* | 1/2012 | Erick .................. G01C 21/265 |
| 2012/0208466 A1 | 8/2012 | Park et al. |
| 2015/0363348 A1* | 12/2015 | Allen .................... B60K 35/10 |
| 2017/0054328 A1 | 2/2017 | Jung et al. |
| 2018/0011673 A1 | 1/2018 | Kim et al. |
| 2018/0284889 A1 | 10/2018 | Biggs et al. |
| 2019/0386507 A1 | 12/2019 | Kasar et al. |

* cited by examiner

FIG. 7

VEHICULAR DISPLAY HAVING RECHARGING MODULE WITH ANNEXATION INTERFACE

CROSS REFERENCE TO RELATED APPLICATION

This application claims the benefit under 35 U.S.C. § 119(e) to U.S. Provisional Patent Application No. 63/243,883, filed Sep. 14, 2021, entitled "VEHICULAR DISPLAY HAVING RECHARGING MODULE WITH ANNEXATION INTERFACE," which is incorporated herein by reference in its entirety.

FIELD OF THE DEVICE

The device is in the field of vehicle displays, and more specifically, a vehicle display that includes a recharging interface for charging a portable computing device, such as a cell phone, tablet, or other similar device. In addition to the recharging capability, the vehicular display includes an annexation interface that annexes the portable display of the portable computing device as part of the vehicular display.

BACKGROUND OF THE DEVICE

Within conventional vehicles, one or more displays are positioned within a console of a vehicle, among other emerging spaces that are being used to house displays within a vehicle. These displays can take up a large amount of space to provide the necessary information to the operator and occupants of the vehicle. These displays are typically in the form of digital displays that may have a touchscreen interface or other user interface controlled to operate the display screen and components of the vehicle.

SUMMARY OF THE DISCLOSURE

According to an aspect of the present disclosure, a vehicle includes a host display that has a graphic user interface that incorporates a touchscreen. At least a portion of the host display includes a charging interface. A docking port is disposed proximate the host display. The docking port is configured to selectively couple with a portable computing device that has a portable display. Engagement of the portable computing device with the docking port places the portable display of the portable computing device in front of the charging interface of the host display. A controller of the host display is placed in electrical communication with the portable computing device to charge a battery cell of the portable computing device. Engagement further adjusts the graphic user interface of the host display to selectively assimilate the portable display of the portable computing device to define the portable display as an annexed display of the host display.

According to another aspect of the present disclosure, a user interface for a vehicle includes a host display that has a graphic user interface, wherein at least a portion of the host display includes a charging interface, and a touchscreen of the host display that incorporates the graphic user interface. A docking port of the touchscreen is configured to selectively receive a portable computing device that has a portable display. Engagement of the portable computing device with the docking port of the touchscreen places the portable display of the portable computing device in front of the portion of the touchscreen that selectively defines the docking port. A controller of the host display is placed in electrical communication with the portable computing device to charge a battery cell of the portable computing device. Engagement further adjusts the graphic user interface of the host display to selectively assimilate the portable display of the portable computing device to define the portable display as an annexed display of the host display. Assimilation of the portable display includes at least one of migrating concealed portions of the graphic user interface that are behind the portable computing device to an area surrounding the docking port of the touchscreen, and migrating the concealed portions of the graphic user interface onto the portable display. The touchscreen that defines the docking port is operated via the portable display.

According to yet another aspect of the present disclosure, a charging surface for a vehicle includes a host display that has a graphic user interface and a touchscreen of the host display that incorporates the graphic user interface. A charging interface of the touchscreen is configured to selectively receive a portable computing device that has a portable display. Engagement of the portable computing device with the charging interface of the touchscreen places the portable display of the portable computing device in front of a portion of the touchscreen that selective defines the charging port. A controller of the host display is placed in electrical communication with the portable computing device to charge a battery cell of the portable computing device via the charging port. Engagement further adjusts the graphic user interface of the host display to selectively assimilate the portable display of the portable computing device to define the portable display as an annexed display of the host display. The host display includes an emissive layer and a conductive layer that have electrons transmitted therebetween during use of the host display. The transfer of the electrons within the charging interface is directed to the portable computing device to provide wireless charging via the charging interface of the touchscreen.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
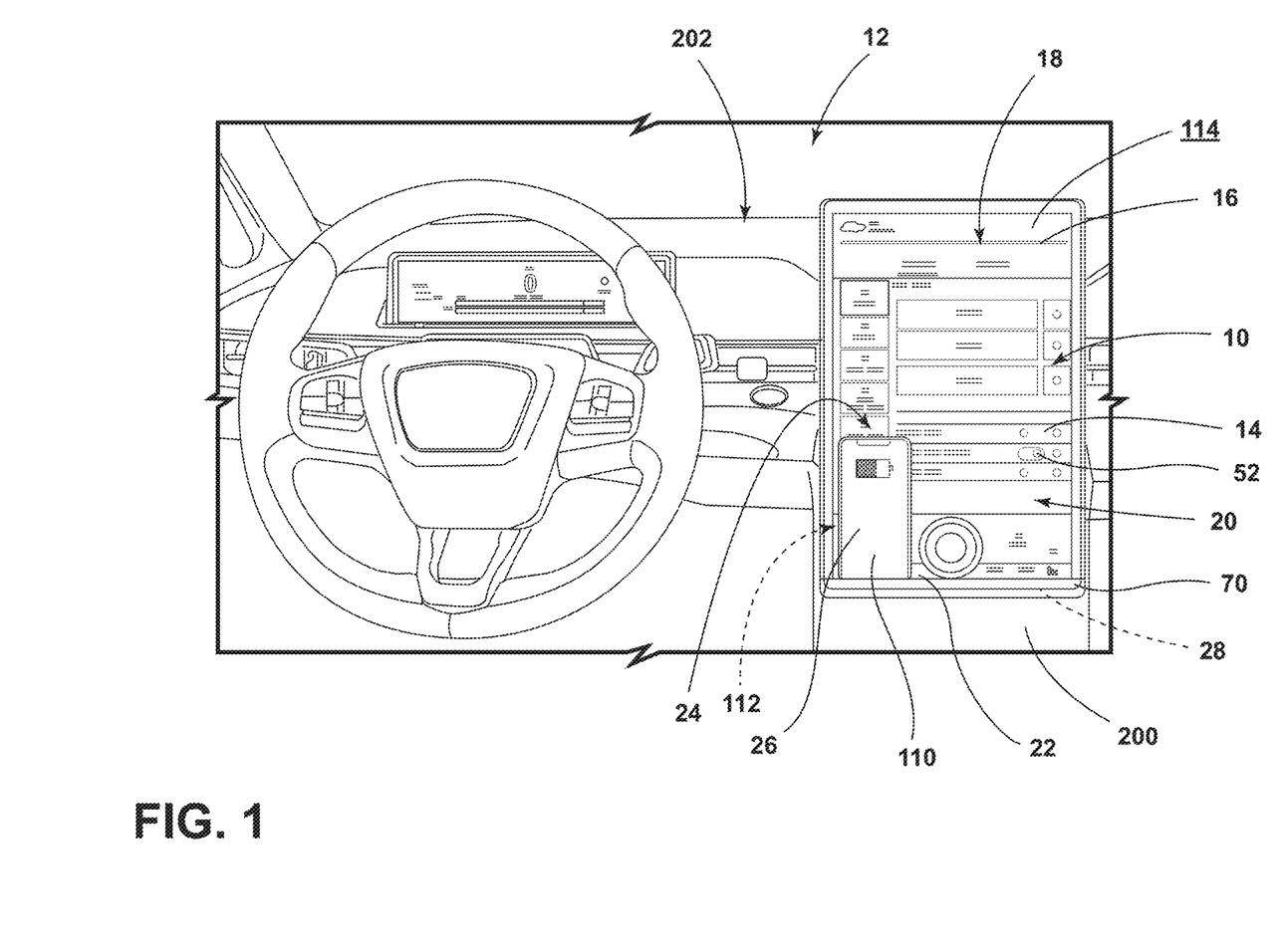
FIG. 1 is a perspective view of a vehicular display that incorporates an aspect of the annexation interface.
Figure 2:
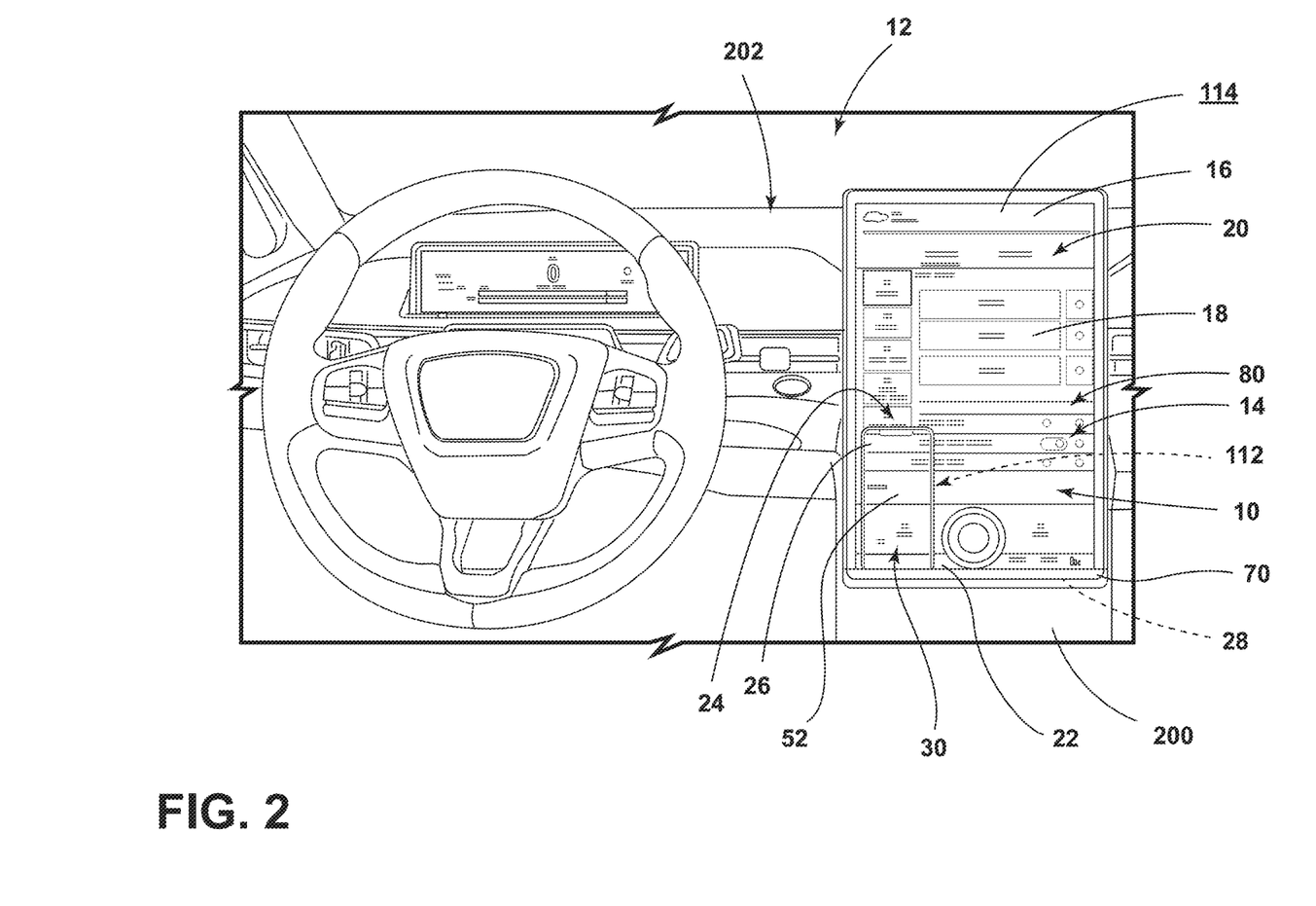
FIG. 2 is a perspective view of the vehicular display of FIG. 1 and showing annexation of the portable display that is integrated with the vehicular display.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a display screen within a vehicle that includes a recharging interface and an annexation capability for incorporating the portable display of the portable computing device to be part of the display for the vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-7, reference numeral 10 generally refers to a host display that is incorporated within a vehicle 12. Typically, a vehicle 12 includes at least one host display 10, and typically includes a plurality of host displays 10 that provide various information to the user and also serve as an interface point or user interface 14 for allowing the operator or occupant of the vehicle 12 to control various components of the vehicle 12. These host displays 10 typically include a digital display and also include one or more touchscreen interfaces 16 or other user interfaces 14 that allow for interaction by an occupant of the vehicle 12 with the host display 10 of the vehicle 12. According to various aspects of the device, the vehicle 12 includes a display having a graphic user interface 18 (GUI) that incorporates the touchscreen interface 16. At least a portion of the host display 10 includes a charging interface 20. In this manner, the host display 10 can also define a charging surface 114. A docking port 22 is disposed proximate the host display 10. The docking port 22 is configured to selectively couple, at least electronically, with a portable computing device 24 that includes a portable display 26. When engaged with the docking port 22, the portable computing device 24 is placed over the host display 10 and conceals at least a portion of the GUI 18 for the host display 10. Engagement of the portable computing device 24 with the docking port 22 places the portable display 26 of the portable computing device 24 in front of a portion of the host display 10. Through this engagement, a controller 28 of the host display 10 is placed in electrical communication with the portable computing device 24. This electrical communication activates the charging interface 20 that charges a battery 68 such as a battery cell of the portable computing device 24. The engagement of the portable computing device 24 with the docking port 22 also adjusts the GUI 18 of the host display 10 to selectively assimilate the portable display 26 of the portable computing device 24 to define the portable display 26 as an annexed display 30 of the host display 10 for the vehicle 12. According to the various aspects of the device, the docking port 22 and the charging portion 112 of the charging interface 20 are defined by the same portion of the host display 10. This charging portion 112 being the area of the host display 10 that is concealed by the portable computing device 24. It is also contemplated that the docking port 22 can define or include a charging portion 112 of the charging interface 20. It is contemplated that the entire host display 10 can define the charging interface 20. In such an aspect of the device, only those portions of the host display 10 that define the docking port 22 also define the charging portion 112 of the charging interface 20.

In certain aspects of the device, the docking port 22 can be in the form of a physical feature that at least partially supports and locates the portable computing device 24 relative to the host display 10. Such a support can be in the form of a ledge 70 that is positioned along or near an outer edge of the host display 10, as will be described more fully herein. The docking port 22 can also be defined as a portion of the host display 10, such as in the case of a horizontally positioned host display 10. In such a configuration, and as will be described more fully below, the docking port 22 is that portion of the host display 10 that is concealed by, covered by, or supporting the portable computing device 24. In addition, during operation of the vehicle 12, the portable computing device 24 may slide or otherwise change location relative to the host display 10. During such movement, the portable display 26 and the GUI 18 of the host display 10 can adjust to this movement of the portable computing device 24. In this manner, the location of the docking port 22 and the charging portion 112 of the host display 10 can change and adjust over time according to where the portable computing device 24 is placed and where the portable computing device 24 may move, relative to the host display 10 during operation of the vehicle 12.

Referring again to FIGS. 1-6, when the portable computing device 24 is placed on top of the host display 10, the portable computing device 24 conceals at least a portion of the host display 10 for the vehicle 12. In the case of a tablet, a significant portion of the host display 10 can be concealed. To accommodate the charging of the portable computing device 24, without sacrificing or eliminating a portion of the host display 10 for the vehicle 12, the controller 28 for the host display 10 annexes the portable display 26 for the portable computing device 24 to temporarily serve as a portion of the host display 10. Accordingly, those interactive portions of the GUI 18 that are concealed by the portable computing device 24 can be adjusted or mirrored to appear on the now annexed portable display 26 of the portable computing device 24. In this manner, the portable display 26 for the portable computing device 24 is converted to the annexed display 30 that has effectively become part of the host display 10. This annexation includes not only the visible screen of the portable computing device 24 but also the touch interface 110 capabilities of the portable computing device 24. Accordingly, the portable computing device 24, through engagement with the docking port 22, can become assimilated within and annexed to the host display 10 for the vehicle 12.

This assimilation and annexation of the portable display 26 occurs without distortion of the host display 10 for the vehicle 12. Accordingly, interaction of the portable computing device 24 with the host display 10 does not cause a distortion of the GUI 18 within the host display 10, other than the planned manipulation of the GUI 18 between the host display 10 and the annexed display 30, as discussed herein. In this manner, the engagement of the portable computing device 24 with the host display 10 and the assimilation of the portable display 26 to become an annexed display 30 of the host display 10 does not result in a loss of resolution of the host display 10 or the portable display 26. The degradation or distortion of these displays are minimized or are entirely eliminated during engagement of the portable computing device 24 with the docking port 22.

Figure 4:
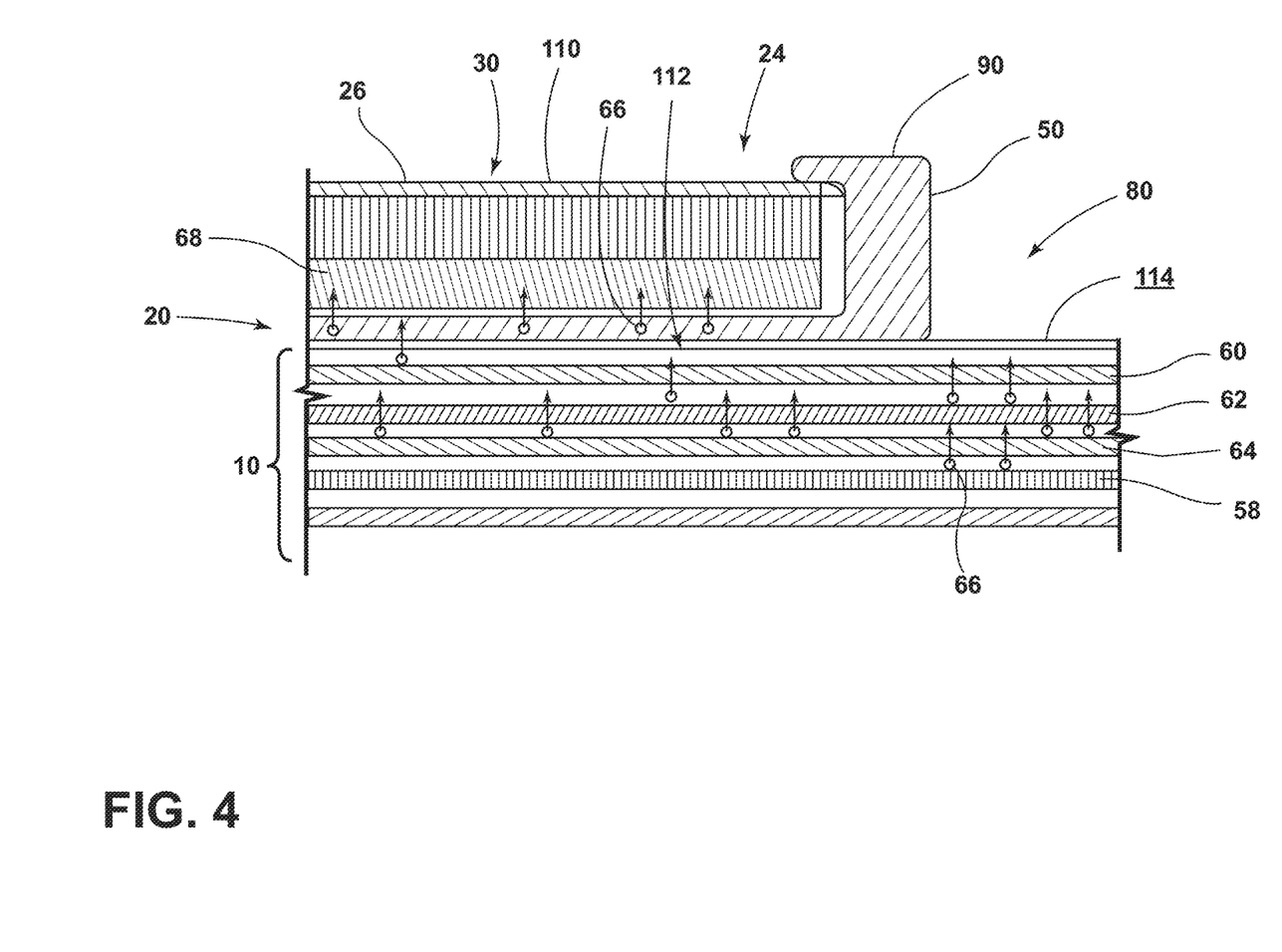
FIG. 4 is a schematic diagram illustrating an aspect of one type of vehicular display that can be used as a recharging interface for the vehicle.

As exemplified in FIG. 4, which represents a basic cross-sectional schematic of a host display 10 having a light emitting diode 82 (LED), an organic light emitting diode (OLED) display, or other similar display, these host displays 10 utilize a flow of electricity in the form of electrons 66 that travel between various layers of the host display 10, such as between an anode 58 and a cathode 60 and through various emissive layers 62 and conductive layers 64, as well as other layers. These electrons 66, which can be in the form of electrons, ions, or other charged particles, typically travel within the layers of the host display 10 to generate photons for producing visible light. Using the device described herein, the charging interface 20 of the host display 10 allows these electrons 66 to travel through the upper layer of the OLED screen of the host display 10 to provide for wireless charging of a battery or batteries 68. When a portable computing device 24 is engaged with the docking port 22, these electrons 66 are permitted to travel through the host display 10 and into the battery 68 of the portable computing device 24 to serve as a wireless charging interface 20 between the portable computing device 24 and the host display 10. The passage of these electrons through the display and to the battery 68 for the portable computing device 24 does not result in a deactivation or change to the GUI 18 in terms of resolution. Those portions of the host display 10 that are covered by the portable computing device 24 remain active and can be mirrored to the annexed display 30 of the portable computing device 24.

Only those portions of the host display 10 that are concealed by the portable computing device 24 are utilized for transmitting electrons 66 to accomplish the recharging functions of the host display 10. Accordingly, those portions of the host display 10 that are not concealed by the portable computing device 24 remain unaffected by the positioning of the portable computing device 24 and operate without distortion. The GUI 18, as described herein, can be modulated or adjusted to accommodate the positioning of the portable computing device 24 to present the GUI 18 for use by the operator or other occupant of the vehicle 12. This interaction creates a generally seamless operation of the GUI 18 between the host display 10 and the annexed display 30 of the portable computing device 24. When the annexed display 30 is coupled with the host display 10, those portions of the host display 10 that are concealed by the portable computing device 24 can be deactivated or may remain active and undistorted. In either instance, the visible portions of the host display 10 remain undistorted and the charging portion 112 of the charging interface 20 operates continuously to charge the coupled portable computing device 24.

When the portable computing device 24 is placed on the host display 10 to define the docking port 22 and the charging portion 112 of the charging interface 20, the electrical current delivered to the area of the touchscreen of the host display 10 that defines the docking port 22 and the charging portion 112 can receive a charging electrical current that provides for operation of the host display 10 as well as the charging functions of the charging interface 20. As described herein, as the portable computing device 24 moves relative to the host display 10, the portion of the host display 10 that defines the docking port 22 and the charging portion 112 of the charging interface 20 can also change.

As discussed herein, the touch interface 110 of the portable computing device 24 is annexed by the host display 10 to be incorporated or mirrored as a portion of the touchscreen interface 16 for the host display 10 for the vehicle 12. Accordingly, interaction by the operator or occupant of a vehicle 12 with the portable computing device 24, while engaged with the docking port 22, can be used to adjust various controls of the vehicle 12. Engagement by the operator or occupant of the vehicle 12 with a portion of the host display 10, or a portion of the annexed display 30 can accomplish adjusting or interacting with various mechanisms of the vehicle 12 via the GUI 18 of the host display 10 and the annexed display 30.

Referring again to FIGS. 3 and 5-6, in certain aspects of the device, placement of the portable computing device 24 with the docking port 22 can also adjust the GUI 18 of the host display 10 to accommodate the placement of the portable computing device 24 over the host display 10. Accordingly, various icons 52 or other interfaces of the host display 10 can be manipulated to migrate outside of the perimeter 50 of the portable computing device 24. In such an instance, the annexed display 30 of the portable computing device 24 can shift between operating as the touch interface 110 for the portable computing device 24 and operating as a portion of the touchscreen interface 16 for the host display 10. When the portable computing device 24 is adjusted to be a touchscreen interface 16 for the portable computing device 24, those icons 52 of the GUI 18 that are located within the annexed display 30 are migrated outside of the annexed display 30 to be within the host display 10 for the vehicle 12. Accordingly, various features of the portable computing device 24 can be accessed as desired while the portable computing device 24 is engaged with the docking port 22.

Figure 3:
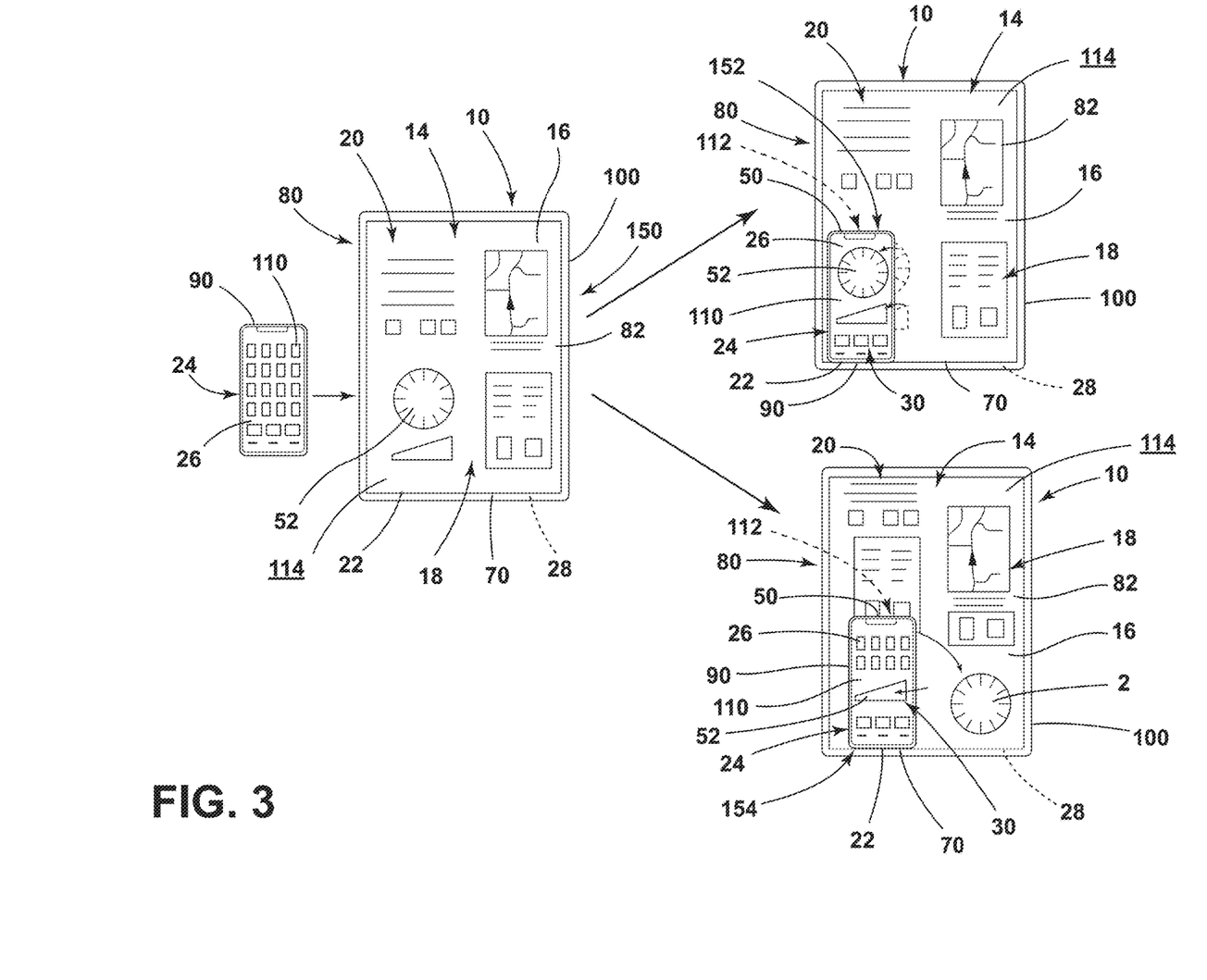
FIG. 3 is a schematic diagram illustrating a migration of components of the graphic user interface for the vehicular display to account for the space occupied by the portable computing device.
Figure 5:
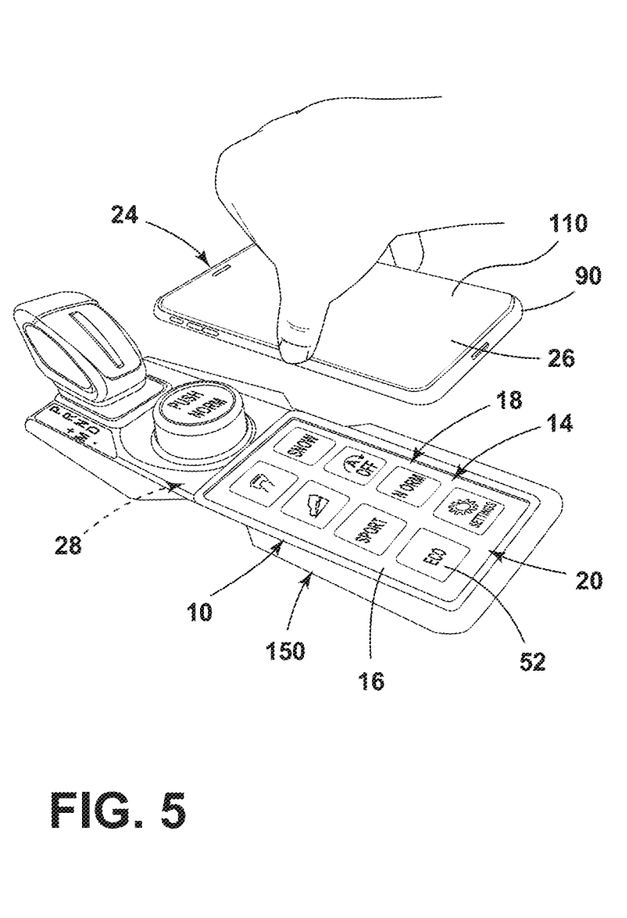
FIG. 5 is a schematic diagram showing placement of a portable computing device onto a vehicular display.
Figure 6:
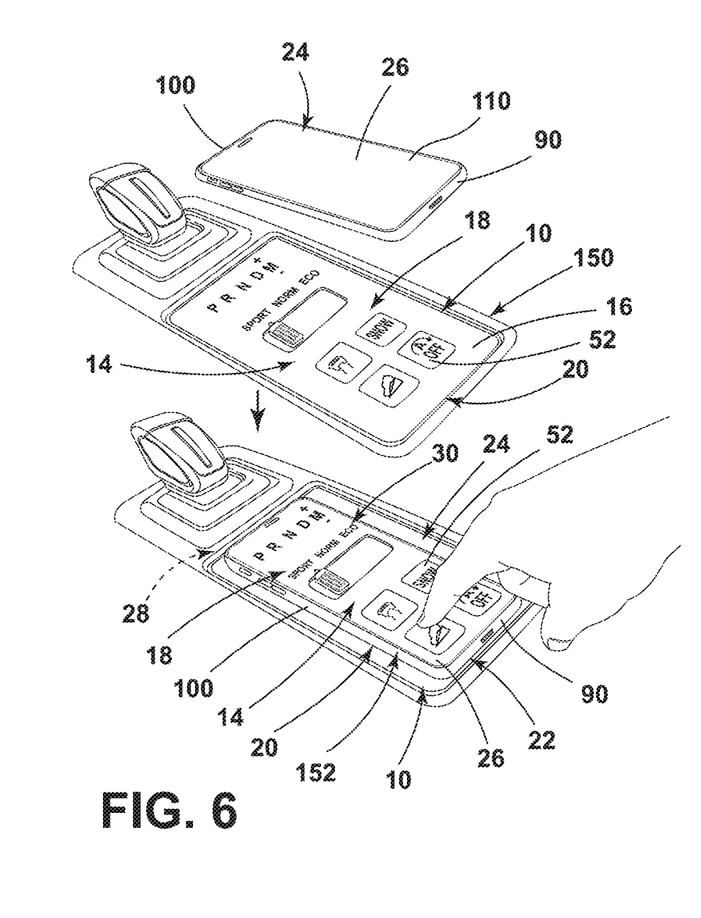
FIG. 6 is a schematic diagram illustrating assimilation of the portable display to become an extension of the vehicle display.

This adjustment of the icons 52 of the GUI 18 can also occur where the portable computing device 24 is coupled with the docking port 22, but is deactivated. In this instance, the deactivation of the portable computing device 24 and the portable display 26 can prevent the annexation described above. Accordingly, the GUI 18 of the host display 10 can migrate to areas outside of the portable computing device 24. In certain aspects, the docking port 22 can be situated such that placement of the portable computing device 24, whether activated or deactivated, conceals lesser used icons 52 of the GUI 18 within the host display 10. Accordingly, the GUI 18 may not adjust or be modified in a significantly appreciable way. Use of the lesser used icons 52 of the GUI 18, in this aspect of the device, can be achieved by moving the portable computing device 24.

It is also contemplated that when the portable computing device 24 is placed on the host display 10, the GUI 18 adjusts so that lesser used icons 52 of the GUI 18 are moved, modulated or otherwise shifted to be located beneath the portable computing device 24. This can occur whether the portable computing device 24 is activated or deactivated. When the portable display 26 is activated, modification of the GUI 18 of the host display 10 can be used where the user may desire access to at least a portion of the icons 52 of the portable display 26 for the portable computing device 24. As discussed herein, the portable display 26 can be temporarily assimilated as part of the host display 10 to be defined as an annexed display 30. This annexed display 30 can be used to display the icons 52 of the portable computing device 24, icons 52 of the GUI 18, or a combination of these icons 52 within the annexed display 30. Where icons 52 of both the GUI 18 and the portable display 26 are modulated to appear on the annexed display 30, the lesser used icons 52 of the GUI 18 can be shifted to be located within the host display 10, but beneath the portable computing device 24.

The shifting of the icons 52 to be beneath the portable computing device 24 can also take place depending on the situation of the vehicle 12. Those icons 52 that may not be needed or used while the vehicle 12 is in motion can be moved to be located beneath the portable computing device 24. When the vehicle 12 stops, the icons 52 of the GUI 18 can again shift to place other or additional icons 52 beneath the portable computing device 24.

Where the host display 10 is a horizontal display and the docking port 22 is defined by any surface of the host display 10 that is concealed by the portable computing device 24, the portable computing device 24 may slide along the surface of the host display 10, such as when the vehicle 12 accelerates or decelerates rapidly or makes a sharp turn. In such an instance, the GUI 18 for the host display 10 may continually adjust to accommodate such movement of the portable computing device 24. This may include an adjustment, in real time, of those portions of the GUI 18 that are mirrored to the annexed display 30. In addition, this movement of the portable computing device 24, may also result in a continual migration of the icons 52 of the GUI 18 during the movement of the portable computing device 24. Alternatively, it is contemplated that during such movement of the portable computing device 24, the annexed display 30 converts to a mirrored portion of the host display 10 and the GUI 18 until such time as the portable computing device 24 comes to a rest on the host display 10.

Referring again to FIGS. 1-3 and 5-6, the docking port 22 can be a specifically defined location on the host display 10 such that placement of the portable computing device 24 in a repeated and consistent location can result in the engagement of the portable computing device 24 with the docking port 22. Various detents, locating features, and other physical mechanisms can be used to locate portable computing device 24 on the host display 10. By way of example, and not limitation, the host display 10 can include a lower ledge 70 on which the portable computing device 24 can rest. This ledge 70 can include various locating mechanisms for positioning the portable computing device 24 over a particular portion of the host display 10. These locating devices can also be used to prevent sliding and other displacement of the portable computing device 24 during operation of the vehicle 12, such as while turning the vehicle 12.

Referring again to FIGS. 1-3 and 5-6, it is also contemplated that the portable computing device 24 can be located on any portion of the host display 10. In such an aspect of the device, the docking port 22 can be in the form of a mobile interface 80 that activates wherever the portable computing device 24 is placed onto the host display 10 for the vehicle 12. The particular portions of the host display 10 can be used to detect the presence of the portable computing device 24 over that portion of the host display 10. This can be useful where the portable computing device 24 can be a smart phone, tablet, multiple devices, or combinations thereof. The various light emitting diodes 82 (LED) of the host display 10 can detect the presence and the outer perimeter 50 of each portable computing device 24 and can communicate with the controller 28 to annex each portable display 26 to be an annexed display 30 of the host display 10 for the vehicle 12. Accordingly, no matter where the particular portable computing device 24 is located on the host display 10, that portable computing device 24 can be assimilated as an annexed display 30 to be integrated with the touchscreen interface 16 of the host display 10 for the vehicle 12. As discussed herein, this assimilation of the portable display 26 to be an annexed display 30 occurs without distortion of the host display 10 or the portable display 26.

In use, an operator of the vehicle 12 can place their portable computing device 24, such as a smart phone, onto the host display 10 to engage with the docking port 22 of the host display 10. As an example, the portable computing device 24 may be placed over an HVAC icon 52 of the GUI 18. When the portable computing device 24 is placed in this location, the HVAC icon 52 of the GUI 18 can appear on the now annexed display 30 of the portable computing device 24. As discussed herein, engagement of the annexed display 30 for the portable computing device 24 can be used to interact with the HVAC controls of the GUI 18 to adjust the environment of the passenger cabin. Where the operator of the vehicle 12 desires to interact with the portable computing device 24, specifically, the HVAC icon 52 of the GUI 18 can migrate to an area outside of the outer perimeter 50 of the portable computing device 24 so that the controls for the portable computing device 24 can be accessed. The HVAC icon 52 of the GUI 18, which have migrated outside of the perimeter 50 of the portable computing device 24, is also accessible. It is contemplated that the various components of the GUI 18, to accommodate the space for the portable computing device 24, can be manipulated in size, scale and position to accommodate the engagement of the portable computing device 24 with the docking port 22. The GUI 18 can be adjusted to occupy the annexed display 30, or to vacate the annexed display 30 to allow for manipulation of the controls for the portable computing device 24. This modulation can occur via voice command, via engagement of a portion of the user interface 14, or by other similar control on the host display 10 or the portable display 26.

As exemplified in FIGS. 1-3 and 5-6, the portable computing device 24 conceals a portion of the host display 10. Various sensors can be utilized to monitor and ascertain where the outer perimeter 50 of the portable computing device 24 exists over the host display 10. Various cameras can be used to determine the outer perimeter 50. It is also contemplated that various proximity sensors, light sensors, or other similar sensors can be incorporated within the host display 10 for monitoring where the outer boundaries of the portable computing device 24 exist over the host display 10. In addition, the position of the portable computing device 24 and the outer perimeter 50 thereof can be determined using information stored within the vehicle 12 or on a cloud-based computing interface. This information can be accessed via any one or more of various communication protocols that can include, but are not limited to, Bluetooth, NFC, RFID, Cloud, combinations thereof and other similar protocols. The stored data can relate to the portable computing device 24, such as device model, screen size, resolution, position, and other similar data. This data can be used by the controller 28 of the host display 10 for determining the size and position of the portable computing device 24 as well as the details of the adjustment, mirroring or other modulation of the GUI 18 that may occur.

In determining the outer boundary 100 of the portable display 26, this can be used to ascertain the level of migration or the distance of migration the icons 52 for the GUI 18 has to accommodate in order to move outside of the outer perimeter 50 for the portable computing device 24. This can be accomplished through various memory functions, where the portable computing device 24 of the operator of the vehicle 12 or through particular users of the vehicle 12 can store the parameters of their particular device within the memory of the vehicle 12.

Utilizing the docking port 22 of the host display 10, the portable computing device 24 is assimilated within the host display 10 to become an extension of the host display 10 itself. Accordingly, controls and icons 52 of the GUI 18 that are typically operated through the touchscreen interface 16 for the host display 10 itself can now be operated through the annexed display 30 of the portable computing device 24. When the portable computing device 24 is removed from the docking port 22, the portable display 26 ceases to become an annexed display 30 and the host display 10 for the vehicle 12 returns to a typical state 150 of the GUI 18.

Referring again to FIGS. 1-6, when the portable computing device 24 is engaged with the docking port 22, the portable computing device 24 is being charged through coils and the portable computing device 24 typically displays on the portable display 26 that the device is charging. Various mechanisms in the host display 10 and/or other portions of the vehicle 12 or device are used to ascertain the outer perimeter 50 of the portable computing device 24 to determine how the GUI 18 needs to be modulated or which portions of the GUI 18 need to be transferred to the annexed display 30 of the portable computing device 24. It is contemplated that the transfer of electrons 66 through the host display 10 via the charging portion 112 of the charging interface 20 can be used as an indicator of which portions of the host display 10 are concealed by the portable computing device 24. Where the portable computing device 24 includes a case 90 or an outer bezel, certain portions of the portable computing device 24 will not be used to transfer electrons 66, but still conceal portions of the host display 10. Position detecting mechanisms, as described herein, may be utilized for ascertaining the outer boundaries of the portable computing device 24 and any case 90 that surrounds the portable computing device 24.

According to various aspects of the device, multiple portable computing devices 24 may also be used on the host display 10, and each portable display 26 of the various portable computing devices 24 can become an annexed display 30 of the host display 10 of the vehicle 12. In certain aspects of the device, it is contemplated that the entire host display 10 of the vehicle 12 can be occupied by annexed displays 30 of various portable computing devices 24 or a portable computing device 24 of larger size, such as a large tablet. Where multiple portable computing devices 24 are placed on the host display 10, it is contemplated that certain portions of the portable computing device 24 may extend outside of the boundary 100 of the host display 10. In such a situation, only a portion of the portable display 26 may define the annexed display 30 for the vehicle 12.

It is also contemplated that the annexed display 30 can migrate outside of the boundaries of the host display 10. By way of example, and not limitation, a portable computing device 24 can be placed partially against a portion of a host display 10 such that a portion of the portable computing device 24 also extends outside of the boundary 100 for the host display 10. In such a condition, the GUI 18 can migrate to those portions of the portable computing device 24 that are over the host display 10 as well as those portions of the portable computing device 24 that are outside of the boundary 100 of the host display 10.

It is contemplated that the charging capabilities of the host display 10 can be utilized for portable computing devices 24. It is contemplated that the charging capacities can be used for other devices as well. Such devices can include, but are not limited to battery packs, laptops, wearable devices, and other similar rechargeable portable devices.

According to various aspects of the device, the host display 10 having charging capability and also the ability to assimilate and annex a portable display 26 of a portable computing device 24 can be positioned outside of a vehicle 12 as well. In certain aspects of the device, a manhole cover can be integrated with a host display 10, as described herein. Such a host display 10 can be utilized for recharging a vehicle 12. It is contemplated that a vehicle 12, such as an electric vehicle 12 or other rechargeable vehicle 12 can be parked over a manhole cover having a configuration of the host display 10. Those portions of the host display 10 that are uncovered by the vehicle 12, may continue to act as a host display 10 without distortion, utilizing a host display 10 of a manhole cover. Where the host display 10 of the manhole cover includes various information related to traffic or other occurrences within the area, this host display 10 can be transferred or modulated to a separate display within another portion of the local environment, or within a portion of the vehicle 12 to be displayed by a separate annexed display 30 located in the vicinity. These host displays 10 placed upon a particular substrate (such as a manhole cover) can be used to charge any electric vehicle 12 or device. Such devices can include, but are not limited to, rechargeable scooters, rechargeable bicycles, rechargeable fixtures, and other similar devices as described herein that can be recharged wirelessly.

According to the various aspects of the device, the wireless charging capabilities of a particular host display 10 can be utilized for operating as a host display 10 and also operating as a recharging interface 20 or other power supply interface for various vehicles 12, fixtures, devices, and other similar mechanisms. This recharging capability occurs through the host display 10 and without distortion of the host display 10. Portions of the host display 10 that are covered by the portable computing device 24, or other mechanism, can continue to operate. Portions of the GUI 18 that are concealed by the portable computing device 24 are migrated or otherwise moved to another portion of the host display 10 that is not concealed, are integrated or mirrored into an annexed display 30 of the device being charged.

Referring now to FIGS. 1-7, having described various aspects of the device, a method 400 is disclosed for charging a device utilizing a host display 10 for a vehicle 12. According to method 400, a first step 402 includes placing a portable computing device 24 onto a host display 10 for a vehicle 12. Once located on the host display 10 for the vehicle 12, a controller 28 for the host display 10 communicates various authorization protocols with the portable computing device 24 (step 404). Various protocols are engaged to permit access between the controller 28 and the portable computing device 24. Use of these protocols allow the portable display 26 for the portable computing device 24 to be assimilated by the host display 10 to be an annexed display 30 of the host display 10. Once these protocols are completed and access is granted to the host display 10, the portable display 26 for the portable computing device 24 becomes an annexed display 30 that becomes an extension of the host display 10 for the vehicle 12 (step 406). The GUI 18 for the host display 10 for the vehicle 12 is modulated to integrate the annexed display 30 (step 408). This annexed display 30 can include either integration of portions of the GUI 18 onto portions of the annexed display 30 or migration of concealed portions of the GUI 18 to areas outside of the annexed display 30. In the latter example, the portable display 26 for the portable computing device 24 can operate as the touch interface 110 for the portable computing device 24. The portable display 26 for the portable computing device 24 can also be in a hybrid configuration. In such a configuration, part of the portable display 26 can act as the touch interface 110 for the portable computing device 24 and other parts of the portable display 26 can be annexed to perform as a part of the touchscreen interface 16 for the host display 10.

Figure 7:
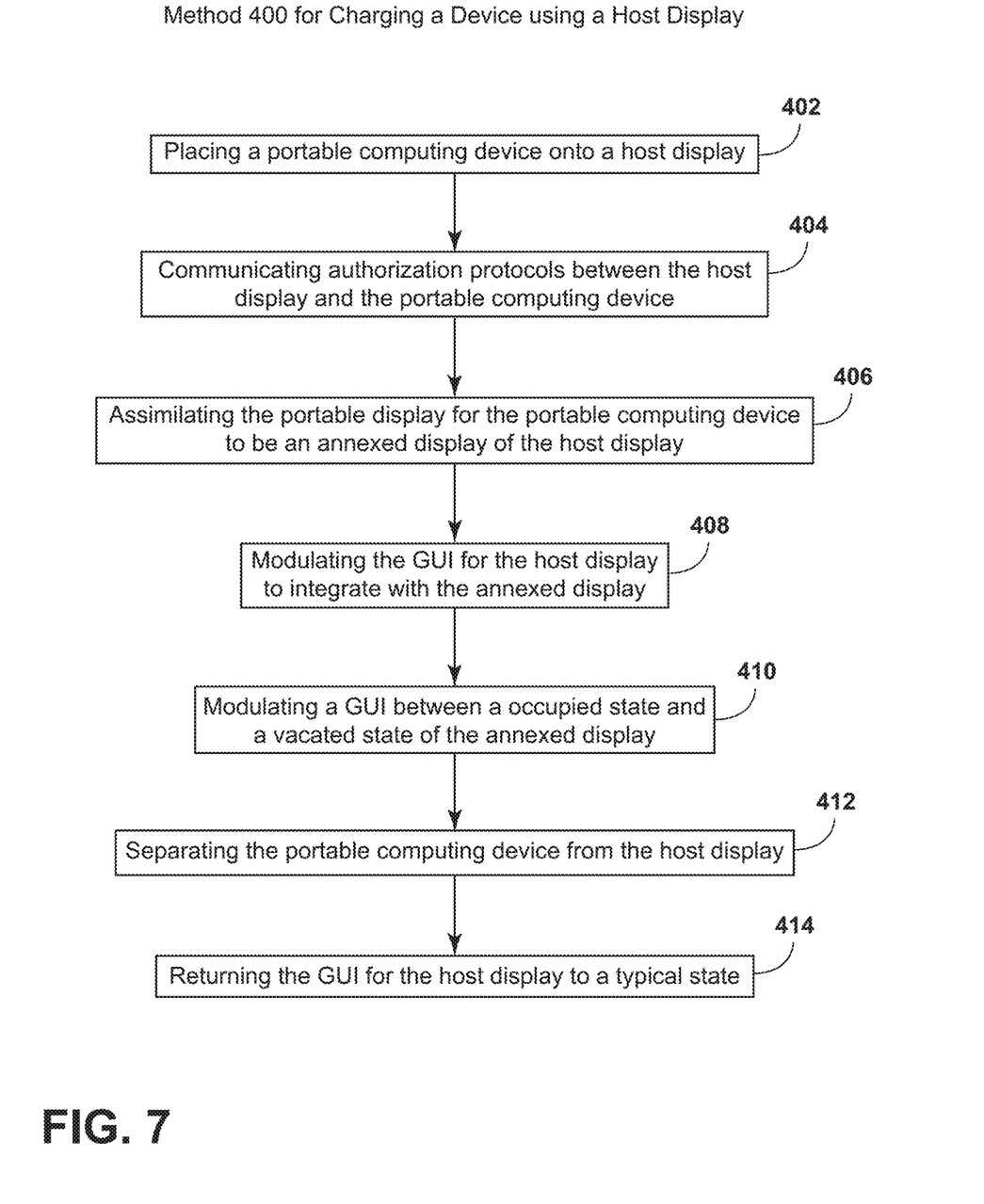
FIG. 7 is a linear flow diagram illustrating a method for recharging a portable computing device using a vehicular display.

According to various aspects of the device, the annexed display 30 for the portable computing device 24 can operate both as a portion of the GUI 18 and also a touch interface 110 for the portable computing device 24 itself. In the case of a vehicle 12 that is being operated, certain features of the phone may be hidden that may not be needed during operation of the vehicle 12. By way of example, and not limitation, using a driver mode, certain icons 52 for games, and other potential operator distractions may be hidden from view during operation of the vehicle 12. Controls for the GUI 18 may migrate onto the annexed display 30 so that only certain features of the portable computing device 24 are visible in addition to various portions of the GUI 18 for the host display 10.

Referring again to FIGS. 1-7, according to the method 400, the GUI 18 for the host display 10 can be modulated between a condition that occupies the annexed display 30 as an occupied state 152 and a condition that migrates outside of the annexed display 30 as a vacated state 154, or combinations thereof, as described herein (step 410). When charging is complete or the occupant or operator of the vehicle 12 is ready to exit the vehicle 12, the portable computing device 24 can be separated from a docking port 22 for the host display 10 (step 412). When removed from the host display 10, the GUI 18 for the host display 10 returns to its typical state 150 and communication between the portable computing device 24 and the controller 28 for the host display 10 is at least temporarily disconnected (step 414).

It is contemplated that communications between the portable computing device 24 and the controller 28 for the host display 10 can occur via various communications devices that can include, but are not limited to, Wi-Fi, Bluetooth, NFC and other similar wireless communications as well as wired communications where the portable computing device 24 can be attached to the host display 10 via a cord.

According to various aspects of the device, the host display 10 that is used to provide the charging interface 20 to a portable computing device 24 can be located in various portions of the vehicle 12. Such locations can include, but are not limited to, a console 200, dashboard 202, headrest, armrest, overhead display, combinations thereof, and other similar and alternative locations within a vehicle 12. The vehicles 12 that can utilize the host display 10 and the charging capabilities and annexation capabilities described herein can include, but are not limited to, family vehicles, ride-share vehicles, fleet vehicles, mass transit vehicles and combinations thereof, and other support vehicles.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A vehicle comprising:
  a host display having a graphic user interface that incorporates a touchscreen, wherein at least a portion of the host display includes a charging interface a docking port disposed proximate the host display, the docking port configured to selectively couple with a portable computing device having a portable display, wherein:
  engagement of the portable computing device with the docking port places the portable display of the portable computing device in front of the charging interface of the host display, the portable computing device concealing a covered portion of the host display
  a controller of the host display is placed in electrical communication with the portable computing device to charge a battery cell of the portable computing device
  engagement further adjusts the graphic user interface of the host display to selectively assimilate, via the controller, the portable display of the portable computing device to define the portable display as an annexed display of the host display, the annexed display displaying the covered portion of the host display
  an area of the host display outside of the covered portion remains unchanged
  wherein assimilation of the portable display includes at least one of migrating the covered portions of the graphic user interface that are behind the portable computing device to an area surrounding the portable computing device, and migrating the covered portions of the graphic user interface onto the portable display.

2. The vehicle of claim 1, wherein the engagement of the portable computing device with the docking port also places a touch interface of the portable computing device in communication with the covered portion of the host display.

3. The vehicle of claim 2, wherein the annexed display of the host display also assimilates the touch interface of the covered portion of the host display, wherein the touch interface of the portable computing device is in communication with the covered portion of the host display.

4. The vehicle of claim 1, wherein the docking port is defined by the charging interface of the host display.

5. The vehicle of claim 4, wherein the docking port communicates wirelessly with the portable computing device via the touchscreen.

6. The vehicle of claim 1, wherein the charging interface and the covered portion are defined by a position of the portable computing device relative to the host display.

7. The vehicle of claim 1, wherein the host display is an organic light emitting diode (OLED).

8. The vehicle of claim 1, where in the charging interface is selectively defined by any portion of the host display.

9. A user interface for a vehicle, the user interface comprising:
  a host display having a graphic user interface, wherein at least a portion of the host display includes a charging interface
  a touchscreen of the host display that incorporates the graphic user interface, wherein a docking port of the touchscreen is configured to selectively receive a portable computing device having a portable display, wherein:
  engagement of the portable computing device with the docking port of the touchscreen places the portable display of the portable computing device in front of a covered portion of the touchscreen that selectively defines the docking port;
  a controller of the host display is placed in electrical communication with the portable computing device to charge a battery cell of the portable computing device
  engagement further adjusts the graphic user interface of the host display to selectively assimilate, via the controller, the portable display of the portable computing device to define the portable display as an annexed display of the host display;
  assimilation of the portable display includes migrating the covered portions of the graphic user interface of the touchscreen that are behind the portable computing device onto the portable display,
  wherein the covered portion of the touchscreen that defines the docking port is operated via the using the portable display such that operations of the covered portion of the host display can be selected using the portable display
  motion of the portable display on the host display automatically modifies the covered portion of the host display and modifies the covered portions of the graphic user interface of the host display that are migrated onto the portable display
  wherein assimilation of the portable display includes at least one of migrating the covered portions of the graphic user interface that are behind the portable computing device to an area surrounding the portable computing device, and migrating the covered portions of the graphic user interface onto the portable display.

10. The user interface of claim 9, wherein the engagement of the portable computing device with the docking port of the touchscreen also places a touch interface of the portable computing device in communication with the host display.

11. The user interface of claim 10, wherein the annexed display of the host display also assimilates the touch interface of the portable computing device, wherein the touch interface is in communication with the host display.

12. The user interface of claim 9, wherein a charging portion of the charging interface is defined within the docking port of the touchscreen, and wherein the charging interface is selectively defined by any portion of the host display.

13. The user interface of claim 9, wherein the host display is an organic light emitting diode (OLED).

14. A charging surface for a vehicle, the charging surface comprising:
  a host display having a graphic user interface; and
  a touchscreen of the host display that incorporates the graphic user interface, wherein a charging interface of the touchscreen is configured to selectively receive a portable computing device having a portable display, wherein:
  engagement of the portable computing device with the charging interface of the touchscreen places the portable display of the portable computing device in front of a concealed portion of the touchscreen that selectively defines the charging interface;
  a controller of the host display is placed in electrical communication with the portable computing device to charge a battery cell of the portable computing device via the charging interface;
  engagement further adjusts the graphic user interface of the host display to selectively assimilate the portable display of the portable computing device, via the controller, to define the portable display as an annexed display of the host display, the annexed display migrating the concealed portion of the host display onto the portable display such that the portable display combines icons of the concealed portions of the host display within icons of the portable display; and
  the host display includes an emissive layer and a conductive layer having electrons transmitted therebetween during use of the host display, wherein the transfer of the electrons within the charging interface is directed to the portable computing device to provide wireless charging via the charging interface of the touchscreen, wherein assimilation of the portable display includes at least one of migrating the concealed portions of the graphic user interface that are behind the portable computing device to an area surrounding the portable computing device, and migrating the concealed portions of the graphic user interface onto the portable display.

15. The charging surface of claim 14, wherein the engagement of the portable computing device with the charging interface also places a touch interface of the portable computing device in communication with the host display.

16. The charging surface of claim 15, wherein the annexed display of the host display also assimilates the touch interface of the portable computing device, wherein the touch interface is in communication with the host display.

17. The charging surface of claim 14, wherein the charging interface is defined by a position of the portable computing device relative to the host display, and wherein the charging interface and the concealed portion move as the portable computing device moves with respect to the host display.

18. The charging surface of claim 14, wherein assimilation of the portable display selectively includes migrating the concealed portions of the graphic user interface that are within the charging interface to an area surrounding the charging interface.

19. The charging surface of claim 14, wherein the charging interface is selectively defined by any portion of the host display.

* * * * *